T. E. LIND.
TRUCK ADJUSTING MECHANISM.
APPLICATION FILED APR. 6, 1914.
1,126,798.
Patented Feb. 2, 1915.
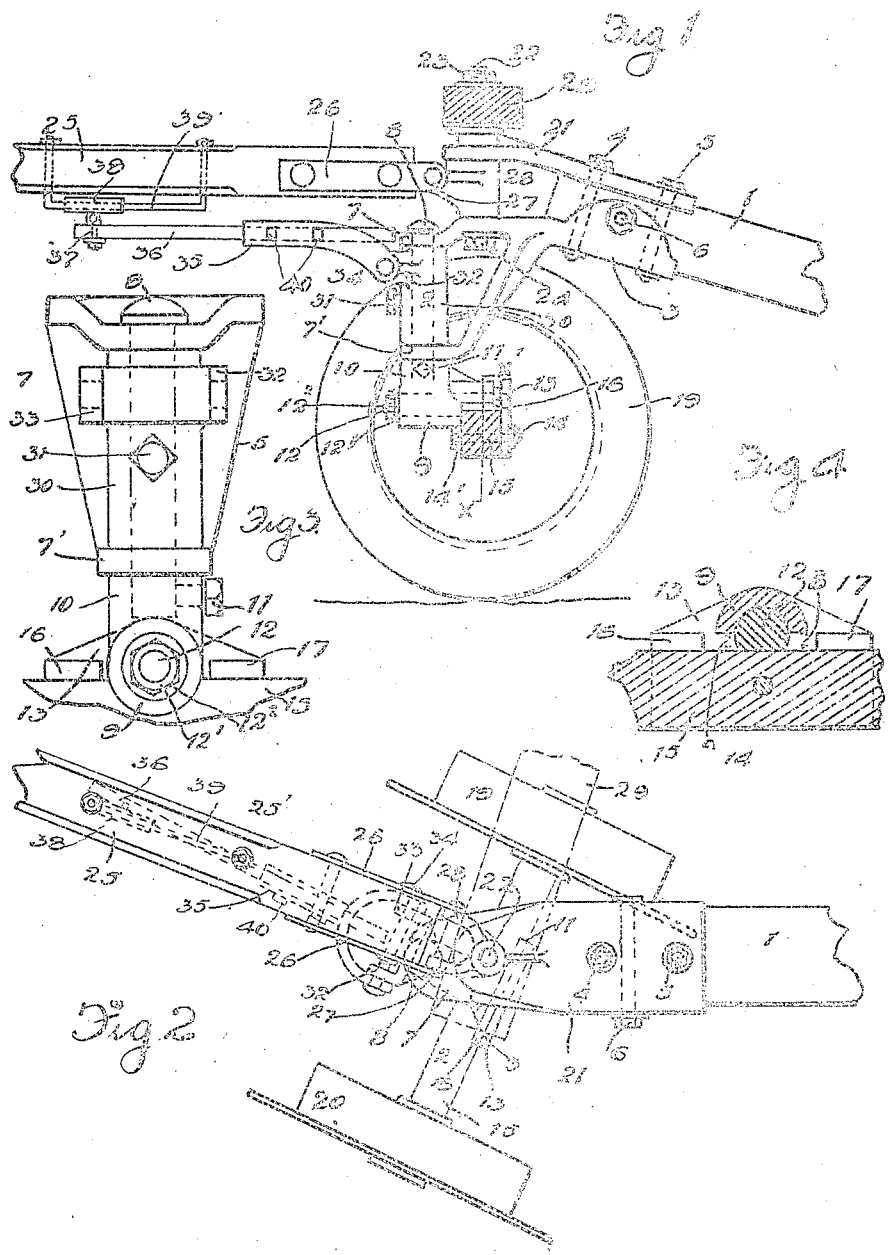
WITNESSES
INVENTOR

UNITED STATES PATENT OFFICE.

TRUED E. LIND, OF BAILDON, SASKATCHEWAN, CANADA.

TRUCK-ADJUSTING MECHANISM.

1,126,798.   Specification of Letters Patent.   Patented Feb. 2, 1915.

Application filed April 9, 1914. Serial No. 829,909.

*To all whom it may concern:*

Be it known that I, TRUED E. LIND, of the village of Baildon, in the Province of Saskatchewan, Canada, have invented certain new and useful Improvements in Truck-Adjusting Mechanisms, of which the following is the specification.

The invention relates to an improvement in truck adjusting mechanisms especially to short turning mechanism for running gear and has particular reference to leading traction machines such as reapers wherein the machine parts have lateral projection relatively to the line of lead and are liable to interfere with the adjacent horse in making a short turn.

The present invention has for its primary object to improve the construction of the mechanism disclosed in my United States Patent No. 967647 dated August 16th, 1910 to effect a more efficient device both from a working and a commercial standpoint, the parts being constructed and arranged so that they can be more readily assembled or replaced in event of breakage and designed to better take up the stresses to which they are subjected when in actual use.

A further object is to provide in a mechanism of this kind a substantial bearing for the truck axle so that it will better withstand the wear and tear to which it is subjected.

With the above objects in view the invention consists essentially in the arrangement and construction of parts hereinafter more particularly described and later pointed out in the appended claims, reference being had to the accompanying drawing in which:

Figure 1 represents a side view of the truck as attached to the stub tongue of the binder. Fig. 2 represents a plan view of the same with the truck in a turned position. Fig. 3 represents an enlarged detailed front view of the main bracket and adjoining parts. Fig. 4 represents an enlarged detailed sectional view through the truck axle and adjoining parts, the section being taken in the plane denoted by the line X—X' Fig. 1.

In the drawing like characters of reference indicate corresponding parts in each figure.

1 represents the usual short tongue of a binder and 2 represents my improved truck mechanism secured to the tongue and supporting the same. The mechanism is now described in detail.

3 is a main bracket permanently fastened by bolts 4, 5 and 6 to the forward end of the tongue, the bracket being formed with a pair of upper and lower forwardly extending arms 7 and 7' which carry a vertically disposed pivot bolt 8.

9 is a horizontally disposed sleeve cast with a top socket 10 which receives the lower end of the pivot bolt 8, the sleeve being secured to the bolt by a clamping screw 11 which enters the socket and jams against the lower end of the bolt. The sleeve received a horizontally disposed pivot shaft 12 having the forward end supplied with a nut 12' and washer 12² and the rear end fitted with a plate 13 to which I have securely fastened by means of a bolt 14 the truck axle 15.

It is hereto be noticed that the plate is provided with a pair of lugs 16 and 17 located at opposite sides of the bolt 14, these lugs preventing any turning movement of the axle on the said bolt. Further it is to be noticed that a portion of the rear end of the sleeve on the under side is cut away to admit the axle, there being sufficient clearance retained at "*a*" and "*b*" between the overhanging portion of the sleeve and the axle to allow the axle to swing and accommodate road conditions.

The above construction gives a large bearing surface in the sleeve for the axle shaft 12 and also allows the parts to be readily dismounted or assembled when required as by undoing the nut 14' of the bolt 14, the nut 12' of the shaft 12 and the screw 11 the axle, plate and sleeve can all be separated for repairs or renewing purposes. The axle carried the usual flanged carriage or road wheels 19 and 20.

21 is a top bracket permanently secured to the forward end of the tongue 1 by means of the bolts 4 and 5. This bracket extends over the main bracket and they carry a vertically disposed draft bolt fitted at the upper and lower ends with nuts 23 and 24.

25 represents the tongue or forward extension of the machine such as a binder which tongue has the rear end thereof provided with a pair of side plates 26 which are connected pivotally by means of a cross pin 27 to a collar 28 pivotally mounted on the draft bolt 22 between the brackets, the collar being cast with a forward U-shaped extension which carries the pin 27 and is spanned by the side plates 26.

The usual double tree 29 is mounted on the draft bolt above the top bracket.

30 is a vertically disposed sleeve mounted on the pivot bolt 8 between the arms of the main bracket and 31 is a clamping screw carried by the sleeve and fastening the same to the bolt. The latter sleeve is cast with a pair of forwardly directed arms 32 and 33 which carry a cross pin 34 connecting the arms with the forked ends of a hollow steering tube 35. The steering tube receives the rear end of an adjusting rod 36 which has its forward end pivotally mounted on a short pin 37 in turn pivotally swung from a sleeve 38 slidably mounted on a carrier rod 39 permanently fastened to the under side of the tongue.

40 are adjusting screws carried by the steering tube and fastening the rod in any desired position within the tube.

I wish it to be noticed that the draft bolt 22 is located directly above the axle but to the rear end of the pivot bolt 8 and also that the rear end of the tongue is directly in advance of the forward end of the stub tongue of the binder.

I have considered it unnecessary to describe in detail all the various features of construction which allow of quick assembling or dismounting as those not herein enlarged upon are very obvious from an examination of the drawing. This demountable feature is very important as will only be appreciated fully by those who are familiar with the troubles experienced in devices of this class which are constantly getting out of order and require to be renewed or repaired. In actual use the draft animals are hitched to the double tree on opposite sides of the tongue and when a turn is made the trucks turn at a greater angle owing to the action of the sleeve 38 which travels on the rod 39. Accordingly none of the animals are crowded in making a short turn.

If it is at any time desired to increase or decrease the angle which the trucks turn in advance of the reach this can be readily accomplished by adjusting the bolts 40 and withdrawing or advancing the sleeve on the rod 39 as will be readily understood.

What I claim as my invention is:—

1. A running gear having a pivoted truck, a tongue fitted on said running gear rearwardly of the point of pivot of the truck and a give and take connection connecting the truck with the tongue, said connection comprising a tube pivotally connected to the truck, a rod adjustably connected to the tube and a sleeve swivelly connected to the rod and slidably mounted on the tongue, as and for the purpose specified.

2. A running gear having a pivoted truck, a tongue fitted to said running gear rearwardly of the point of pivot of the truck and a give and take connection connecting the truck with the tongue, said connection comprising a tube pivotally connected to the truck, a rod telescoped within the tube and adjustably connected to the same, a rod secured to the under side of the tongue, a sleeve slidably mounted on the rod and connecting means pivotally connected to the sleeve and to the forward end of the adjusting rod, as and for the purpose specified.

3. The combination with a stub tongue, of a main bracket secured to the forward end of the tongue and formed with a pair of upper and lower forwardly extending arms, a vertically disposed pivot bolt passing through the arms, a horizontally disposed sleeve secured to the lower end of the pivot bolt, a horizontally disposed shaft rotatably mounted in the sleeve, a truck axle secured to the rear end of the shaft, a vertically disposed sleeve mounted on and secured to the pivot bolt and appearing between the arms, a top bracket secured to the forward end of the tongue and extending over the top arm of the main bracket, a vertically disposed draft bolt connecting the top arm of the main bracket with the top bracket, a collar rotatably mounted on the draft bolt between the brackets, a tongue having the rear end thereof pivotally connected to the collar and a give and take connection between the tongue and the vertically disposed sleeve, as and for the purpose specified.

4. The combination with a stub tongue, of a main bracket secured by releasable bolts to the forward end of the tongue and provided with upper and lower forwardly extending arms, a vertically disposed pivot bolt connecting the arms, a horizontally disposed sleeve releasably secured to the lower end of the pivot bolt, a shaft rotatably mounted in the sleeve and releasably secured to the same, a truck axle releasably secured to the rear end of the shaft, a vertically disposed sleeve mounted on the pivot bolt between the arms and releasably fastened to the same, a top bracket releasably secured to the forward end of the tongue and overhanging the upper arm of the main bracket, a vertically disposed draft bolt carried by the top bracket and the latter arm, said draft bolt being located at a point to the rear of the pivot bolt, a collar mounted on the draft bolt between the brackets, a tongue having the rear end thereof pivotally connected to the collar and a give and take connection connecting the vertically disposed sleeve forwardly with the tongue, as and for the purpose specified.

Signed at Winnipeg this 10th day of March 1914.

TRUED E. LIND.

In the presence of—
G. S. ROXBURGH,
S. SILVERT.